US008840031B2

(12) United States Patent
Tudosie

(10) Patent No.: US 8,840,031 B2
(45) Date of Patent: Sep. 23, 2014

(54) SMART CARD AND A METHOD FOR OPERATING A SMART CARD

(75) Inventor: Mihai Tudosie, Lieboch (AT)

(73) Assignee: Infineon Technologies AG, Neubiberg (DE)

( * ) Notice: Subject to any disclaimer, the term of this patent is extended or adjusted under 35 U.S.C. 154(b) by 190 days.

(21) Appl. No.: 13/517,689

(22) Filed: Jun. 14, 2012

(65) Prior Publication Data

US 2013/0336426 A1 Dec. 19, 2013

(51) Int. Cl.
*G06K 19/06* (2006.01)

(52) U.S. Cl.
USPC ......................................................... 235/492

(58) Field of Classification Search
USPC ................................................ 235/492, 380
See application file for complete search history.

(56) References Cited

U.S. PATENT DOCUMENTS

| 6,012,634 | A * | 1/2000 | Brogan et al. ................. 235/380 |
| 6,199,755 | B1 * | 3/2001 | Matsumoto et al. .......... 235/380 |
| 7,303,136 | B2 * | 12/2007 | Tsunoda et al. ............... 235/492 |
| 7,533,408 | B1 * | 5/2009 | Arnouse ........................... 726/9 |
| 7,558,110 | B2 * | 7/2009 | Mizushima et al. ...... 365/185.04 |
| 7,769,410 | B2 * | 8/2010 | Wang ............................. 455/558 |
| 7,991,434 | B2 * | 8/2011 | Yen et al. ....................... 455/558 |
| 8,086,269 | B2 * | 12/2011 | Wang ............................. 455/558 |
| 2005/0224589 | A1 * | 10/2005 | Park et al. ..................... 235/492 |
| 2009/0172279 | A1 * | 7/2009 | Yuan et al. .................... 711/115 |

FOREIGN PATENT DOCUMENTS

EP 1773079 A1 * 4/2007 ............... H04Q 7/32

* cited by examiner

*Primary Examiner* — Seung Lee

(57) ABSTRACT

A smart card is provided, the smart card including: a first processor; a second integrated circuit; a smart card interface configured to provide communication in accordance with a smart card communication protocol; a determination circuit configured to determine whether the first processor or the second integrated circuit should be coupled with the smart card interface based on received communication data; a converter circuit coupled to the second integrated circuit and configured to convert received communication data between the smart card communication protocol and a further communication protocol wherein the smart card interface is coupled with the second integrated circuit.

24 Claims, 15 Drawing Sheets

206

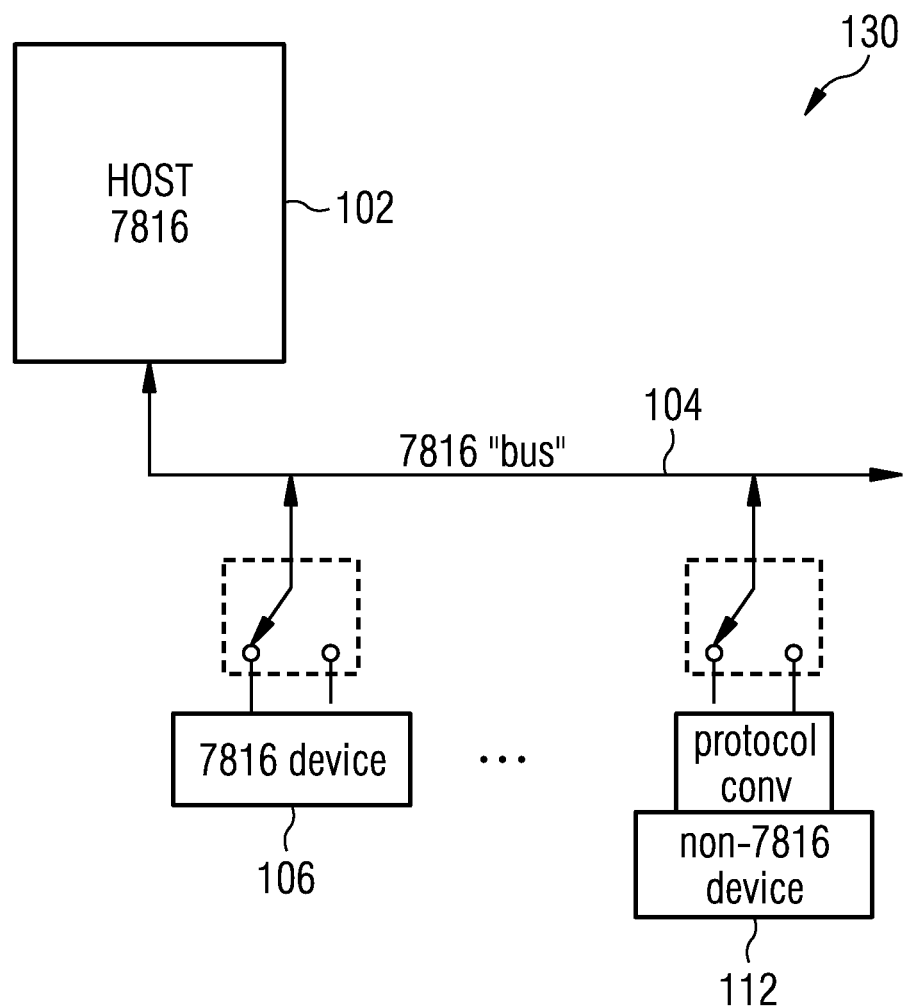

FIG 3

~ 300 providing, by a smart card interface, communication in accordance with a smart card communication protocol; ~ 310 determining, by a determination circuit, whether a first processor or a second integrated circuit should be coupled with the smart card interface based on received communication data; ~ 320 converting, by a converter circuit coupled to the second integrated circuit, received communication data between the smart card communication protocol and a further communication protocol when the smart card interface is coupled with second integrated circuit. ~ 330

FIG 6A

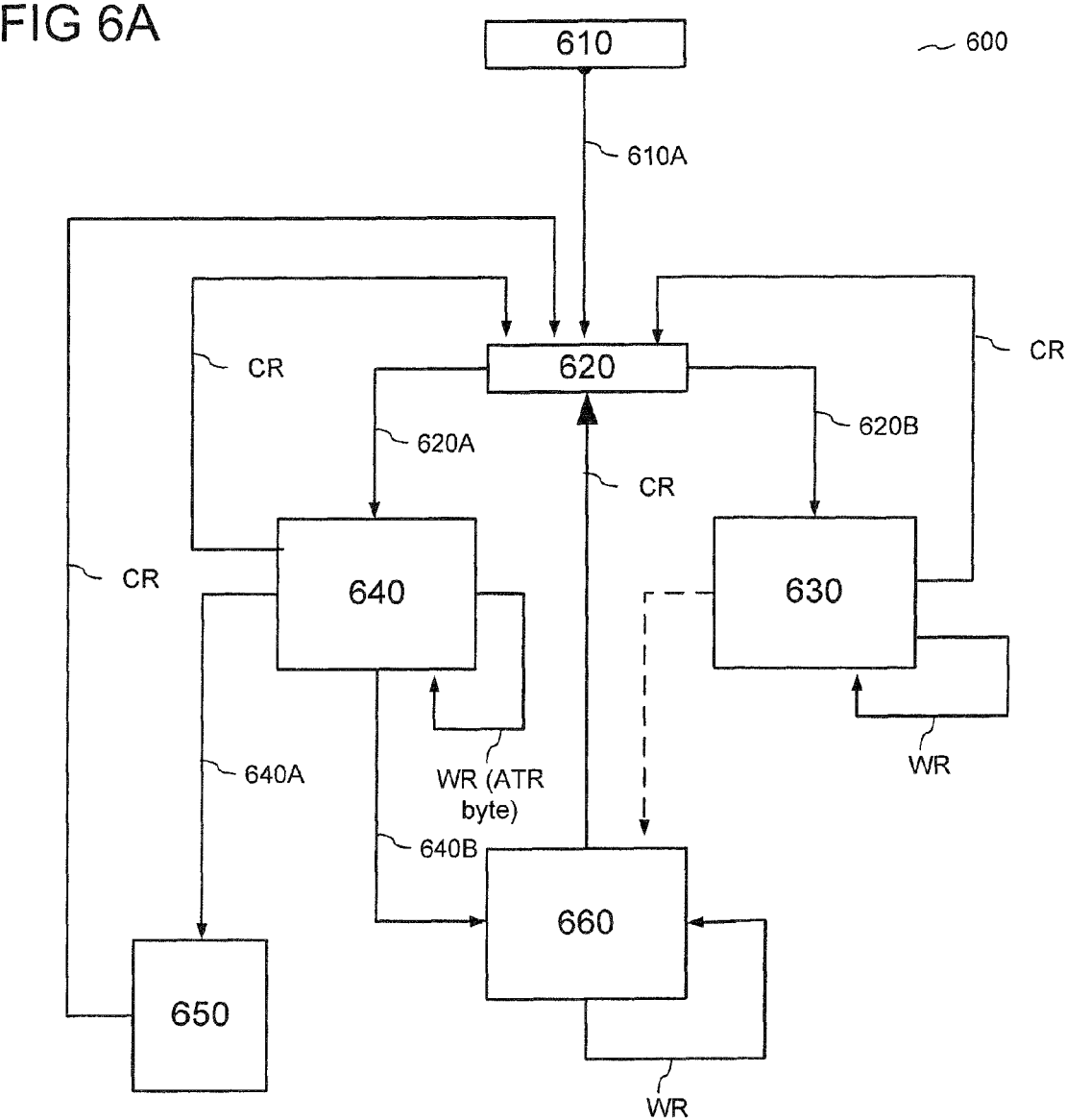

610: Power OFF
610A: Power ON/Enable SE, second integrated circuit IC2 wait init
620: Idle
620A: receive byte 0xFF in first 8 clock pulses; select ISO 7816 mode
620B: receive byte !=0xFF in first 8 clock pulses; disable SE select SPI mode
630: SPI mode selected. IC2 in config mode.
640: ISO 7816 mode selected. Wait ATR/PPS/PPS*
640A: TO or No PPS or legal PPS disables IC2
650: ISO 7816 SE only.
640B: PPS*/ Disable SE
660: IC2
CR: Cold Reset enables SE, IC2 in wait init mode
WR: Warm Reset FIG 13
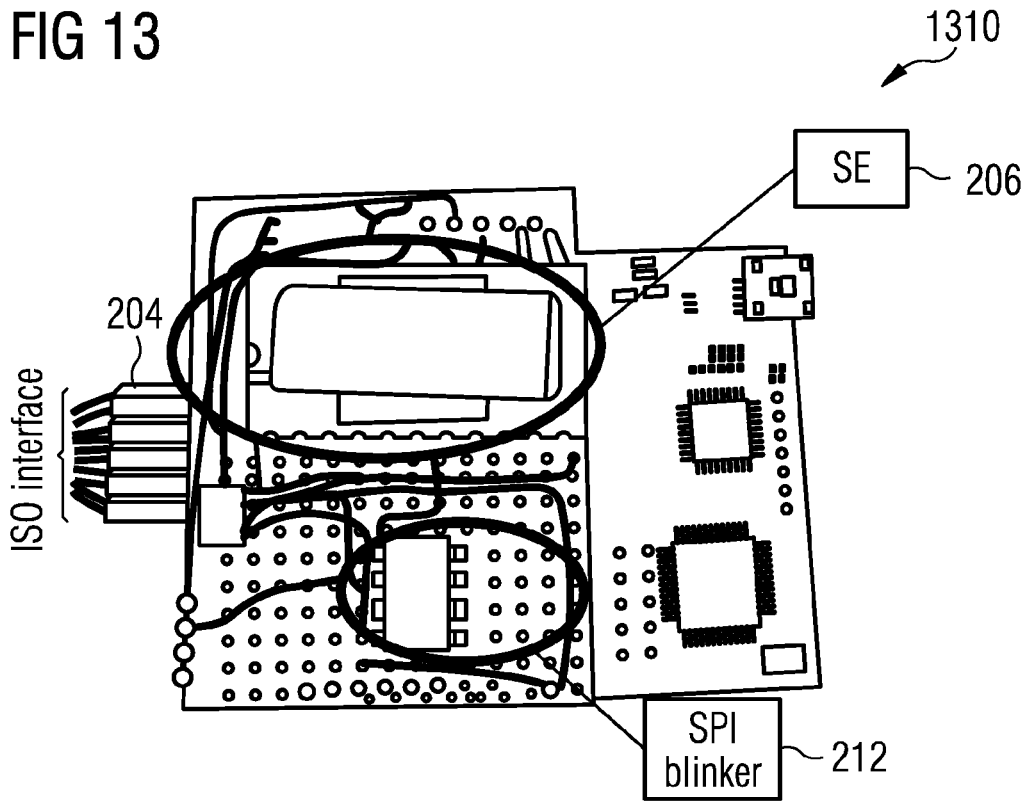
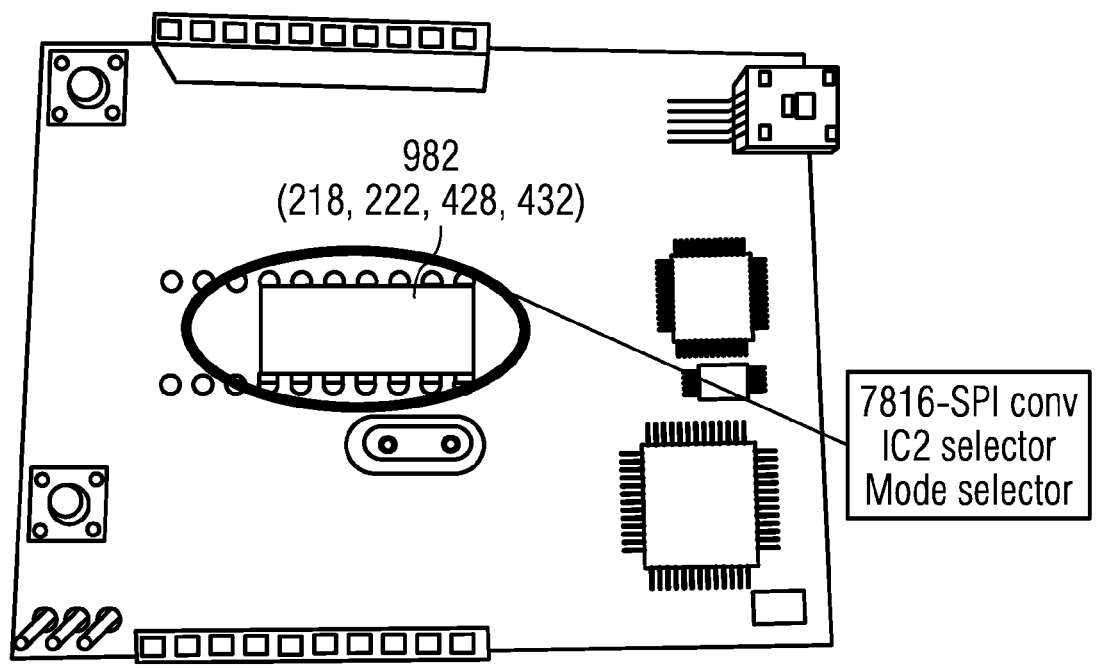

SMART CARD AND A METHOD FOR OPERATING A SMART CARD

TECHNICAL FIELD

Various embodiments relate generally to a smart card and a method for operating a smart card.

BACKGROUND

Current smart cards may include a single chip card controller, wherein an international standards organization ISO 7816 protocol may be used to connect the single chip card controller to a host, e.g. a host controller circuit. The host controller circuit may be a circuit located in a mobile device, e.g. a mobile phone device. Furthermore, the host controller circuit may only be equipped with a single interface, e.g. an ISO 7816 interface for communication with the chip card controller for communication with the chip card controller.

SUMMARY

Various embodiments provide a smart card including: a first processor; a second integrated circuit; a smart card interface configured to provide communication in accordance with a smart card communication protocol; a determination circuit configured to determine whether the first processor or the second integrated circuit should be coupled with the smart card interface based on received communication data; a converter circuit coupled to the second integrated circuit and configured to convert received communication data between the smart card communication protocol and a further communication protocol wherein the smart card interface is coupled with the second integrated circuit.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIGS. 1B and 1C shows a chip to host circuit arrangement according to an embodiment;

FIG. 3 shows a method for operating a smart card according to an embodiment;

FIG. 13 shows a smart card arrangement according to an embodiment.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Figure 1A:
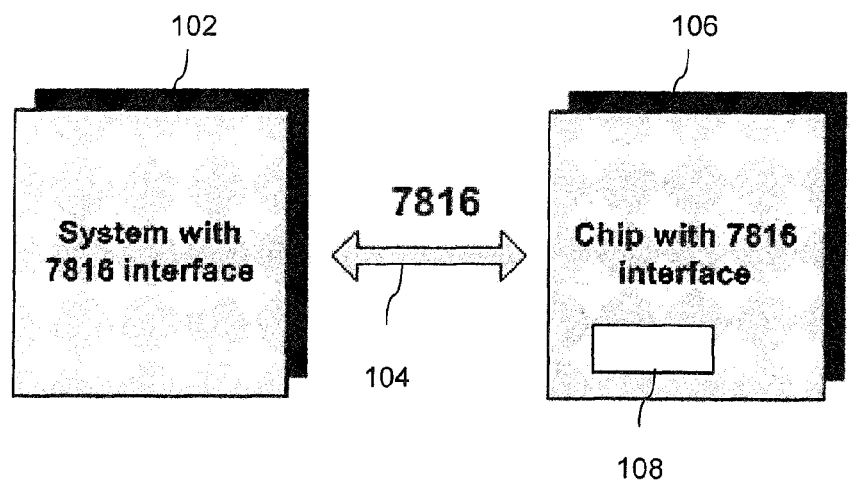
FIG. 1A shows a chip to host controller circuit arrangement.

FIG. 1A shows a host 102, e.g. a host controller circuit, which may only be equipped with a single communication interface, e.g. an ISO 7816 interface 104, and wherein host 102 may be coupled to chip 106. Chip 106 may be embedded in a smart card (not shown here), which may normally include only the one chip 106, with one chip card controller circuit 108. The host controller circuit 102 may be able to connect to the chip and/or the chip card controller circuit 108 via the ISO 7816 interface 104.

Figure 1B:
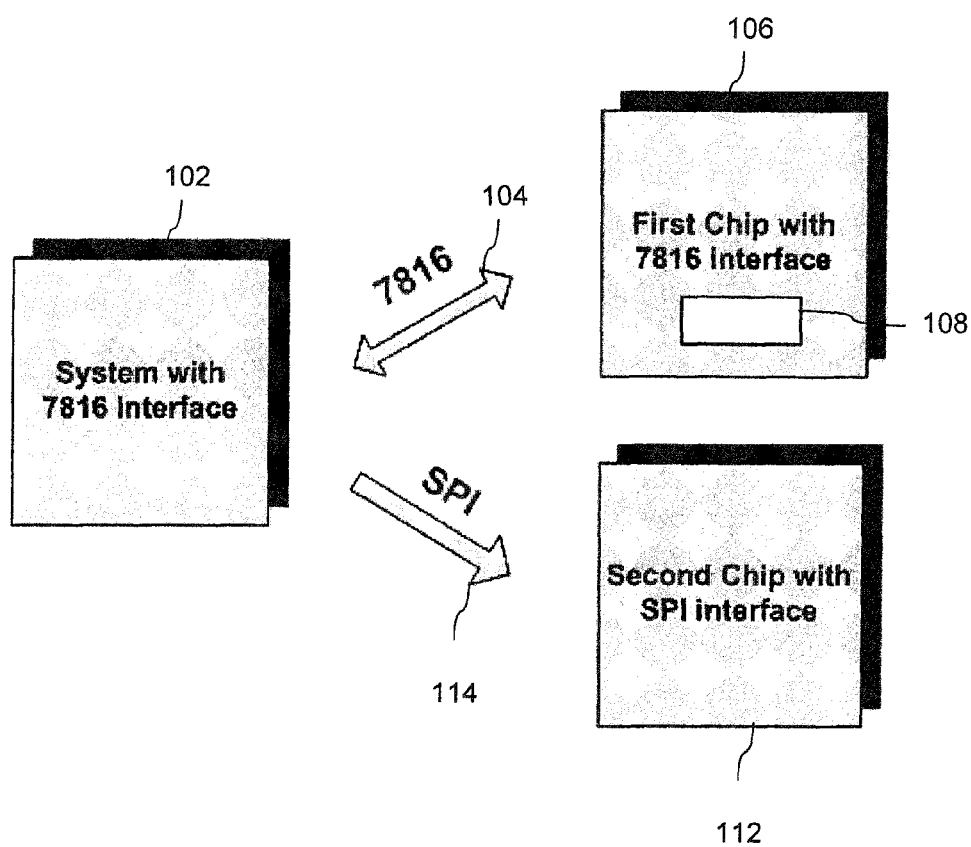

FIGS. 1B and 1C show diagrams of chip to host circuit arrangements according to various embodiments.

As show in FIG. 1B, a circuit arrangement may be configured to include a host controller circuit 102, a first chip 106 and second chip 112. Host 102 may only be equipped with a single interface, e.g. an ISO 7816 interface 104, and host 102 may be coupled to one of first chip 106 and second chip 112. The host controller circuit 102 may be able to connect to the first chip 106 chip and/or the chip card controller circuit 108 via the ISO 7816 interface 104. Second chip 112 may have a different interface 114, e.g. an serial peripheral interface SPI. If connected to the host system 102, the second chip 112 may not be able to use the ISO 7816 interface 104 as the SPI and ISO 7816 interfaces may be completely incompatible. First chip 106 and second chip 112 may be part of a smart card device.

FIG. 1C shows chip to host circuit arrangement 130 according to various embodiments. Arrangement 130 may include e.g. a smart card arrangement, for connecting a first chip 106 and a second chip 112 which normally include incompatible interfaces, to a host controller system 102, through the same interface 104, e.g. an ISO 7816 interface.

Various embodiments further allow the connection of one or more first chips 106, e.g. ISO 7816 enabled devices, and one or more second chips 112, e.g. non-ISO 7816 enabled devices, to the same physical 7816 interface 104, while preserving standards and backward compatibility with existing systems.

Figure 2:
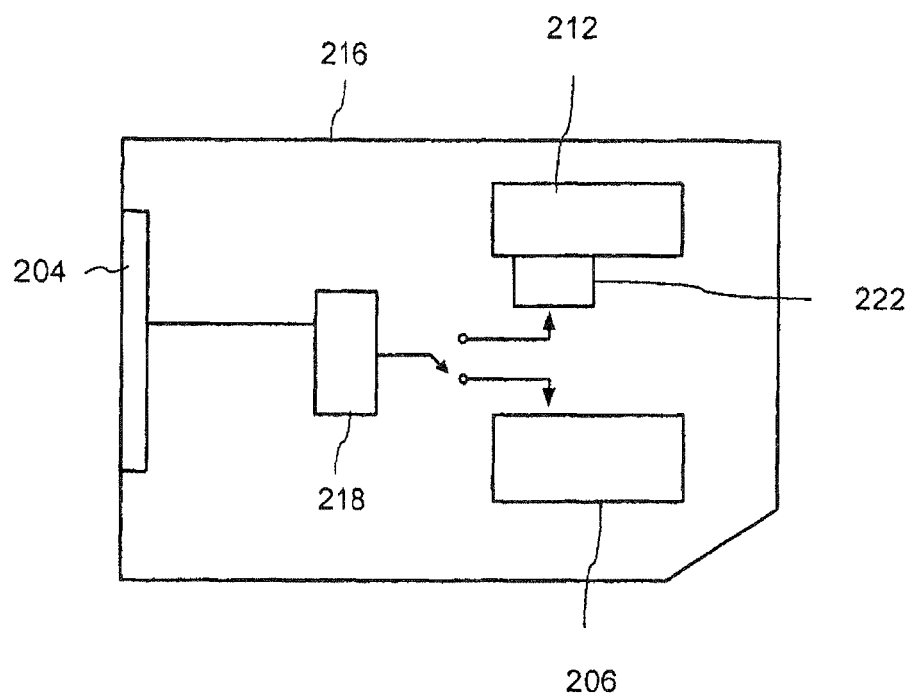
FIG. 2 shows a smart card according to an embodiment.

FIG. 2 shows smart card 216 according to an embodiment;

Smart card 216 may include first processor 206 (e.g. first chip 106); second integrated circuit 212 (e.g. second chip 112); smart card interface 204 configured to provide communication in accordance with a smart card communication protocol; determination circuit 218 configured to determine whether first processor 206 or second integrated circuit 212 should be coupled with smart card interface 204 based on received communication data; converter circuit 222 coupled to second integrated circuit 212 and configured to convert received communication data between the smart card communication protocol and a further communication protocol wherein smart card interface 204 is coupled with second integrated circuit 212.

FIG. 3 shows method 300 for operating a smart card, e.g. smart card 216, according to an embodiment.

Method 300 may include:

providing, by a smart card interface, communication in accordance with a smart card communication protocol (in 310);

determining, by a determination circuit, whether a first processor or a second integrated circuit should be coupled with the smart card interface based on received communication data (in 320);

converting, by a converter circuit coupled to second integrated circuit, received communication data between the smart card communication protocol and a further communication protocol wherein the smart card interface is coupled with second integrated circuit (in 330).

Figure 4:
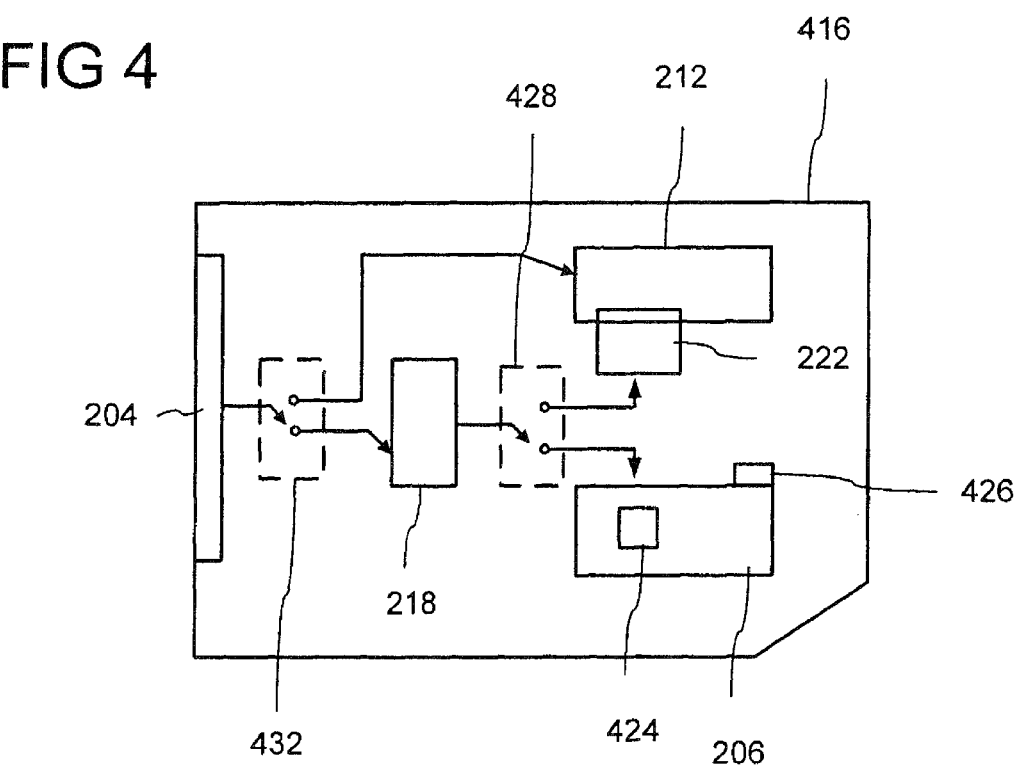
FIG. 4 shows a smart card according to an embodiment.

FIG. 4 shows smart card 416 according to an embodiment.

Smart card 416 may include first processor 206; second integrated circuit 212; smart card interface 204 configured to provide communication in accordance with a smart card communication protocol; a determination circuit 218 configured to determine whether first processor 206 or second integrated circuit 212 should be coupled with smart card interface 204 based on received communication data; converter circuit 222 coupled to second integrated circuit 212 and configured to convert received communication data between the smart card communication protocol and a further communication protocol wherein smart card interface 204 is coupled with second integrated circuit 212.

According to various embodiments, smart card 416 may include a subscriber identification module SIM card. It may be understood that usually, SIM cards may include only first chip, i.e. first processor 206. Therefore, integrating a second chip, i.e. second integrated circuit 212 into a SIM card is not foreseen in current standards.

According to various embodiments, smart card 416 may include a chip card according ISO 7810 standards. According to various embodiments, smart card 416 may include a universal integrated circuit card. According to various embodiments, smart card 416 may include a secure digital card.

For example, smart card 416 may include a SIM card with added functionalities. For example, smart card 416 may include a SIM card, wherein second integrated circuit 212, e.g. an RF (radio) front end device, may be be integrated together with a first processor 206, e.g. a secure element SE, into the SIM. The second integrated circuit 212, i.e. the RF front end, may provide only SPI interface, whereas the first processor 206, i.e. the SE may provide only an ISO 7816 interface.

Figure 5:
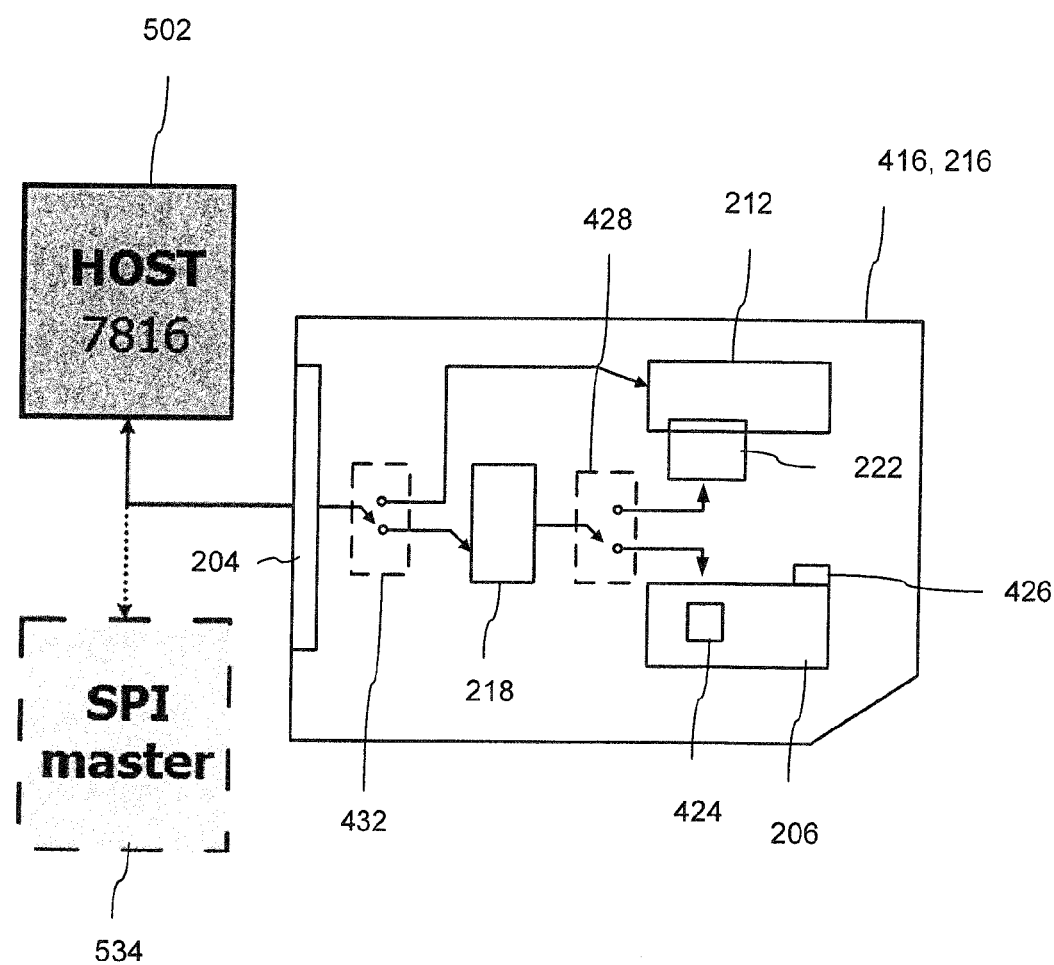
FIG. 5 shows a smart card arrangement according to an embodiment.

FIG. 5 shows a diagram of a smart card, e.g. smart card 416, e.g. smart card 216, arranged with respect to external devices.

As shown in FIG. 5, the smart card, e.g. smart card 216, e.g. smart card 416 may be coupled to either a first controller circuit 502 or a second controller circuit 534 via smart card interface 204. First controller circuit 502 may include a host controller circuit for a host system, e.g. a mobile phone.

First controller circuit 502 may include only one interface, e.g. the smart card interface, e.g. ISO 7816, for providing communication in accordance with the smart card communication protocol. First controller circuit 502 may include an operating system for managing a device. For example, first controller circuit 502 may include an operating system including one or more executable programmable instructions for managing the smart card and/or one or more other devices, and/or one or more hardware devices. Furthermore, first controller circuit 502 may include one or more computer implementable programmable instructions for executing other programmable instructions e.g. applications, e.g. software. First controller circuit 502 may have an added application layer program for communication with second integrated circuit 212.

Second controller circuit 534 may not include an interface which may provide communication in accordance with the smart card communication protocol, e.g. the ISO 7816. Instead, second controller circuit may be configured to communicate in accordance with the further communication protocol, wherein the further protocol may be different from the smart card communication protocol, e.g. the further protocol may be incompatible with the smart card communication protocol. For example, second controller circuit 534 may include but is not limited to including an SPI master circuit. Further communication protocol may include at least one communication protocol from the following group of communication protocols, the group consisting of: a communication protocol for a serial interface, a communication protocol for a parallel interface, a communication protocol for a serial peripheral interface, a communication protocol for an I2C interface.

Smart card interface 204 may provide one or more interconnections, e.g. electrically conductive wires, e.g. electrically conductive lines, e.g. electrically conductive pins, wherein the one or more interconnections which may be made via the smart card interface 204 may allow at least one of the communication protocols, e.g. smart card communication protocol and/or the further communication protocol.

First processor 206 may include a trusted element 424, e.g. a secure microcontroller, e.g. a secure element, which may be configured to store and protect data information. First processor 206 may include a tamper-proof trusted element 424. For example, first processor 206 may be configured, but may not be limited to being configured to process encrypted data information wherein the encrypted data information may be stored in a first memory 426 connected to first processor 206. First processor 206 may include a secure microcontroller, for example a secure element. A secure element may include a secure microntroller which may include a tamper resistant security system, e.g. a secure cryptoprocessor and a secure file system, and security services, e.g. to protect in-memory data. Data stored in the secure element may be protected by encryption against interception and by hardware means against physical attacks. First processor 206 may be configured, but may not be limited to being configured to process encrypted data information, wherein the encrypted data information may be encrypted according to at least one of the following encryption protocols: Data encryption standard (DES), (3DES), Advanced encryption standard (AES). Examples of such encrypted data information may include user data information for example, personal details of the smart card user and/or credit card details of the smart card user. First processor 206 may be configured to communicate via smart card interface 204 in accordance with the smart card communication protocol, e.g. ISO 7816.

Second integrated circuit 212 may optionally be connected to at least one external device from the following group of devices, the group consisting of: an antenna, a display, one or more sensors.

Second integrated circuit 212 may include an RF (radio frequency) front end, which may be configured to amplify RF signals received or transmitted by the first processor 206, i.e. the secure element.

Then at least one external device may be connected to at least one of first controller circuit 502 or second controller circuit 534. Second integrated circuit 212 may be configured to communicate in accordance with the further communication protocol, wherein the further protocol may be different from the smart card communication protocol. Further communication protocol may include at least one communication protocol from the following group of communication protocols, the group consisting of: a communication protocol for a serial interface, a communication protocol for a parallel interface, a communication protocol for a serial peripheral interface, a communication protocol for an I2C interface.

Smart card 416 may include selector circuit 432 coupled to determination circuit 218; wherein selector circuit 432 may be configured to select based on received communication data, e.g. from first controller circuit 502, the smart card communication protocol or the further communication protocol. Device selectors, e.g. determination circuit 218, e.g. selector circuit 432, and possibly some protocol converters, e.g. converter circuit 222, may be used to enable only one of the connected devices, e.g. first processor 206 or second integrated circuit 212, to be connected to smart card interface 204.

Smart card 416 may first be configured to select, e.g. via state machine selector circuit 432, which of first controller circuit 502 and second controller circuit 534 may be connected to smart card interface 204, and therefore operated in either a smart card communication protocol mode or a further communication protocol mode. If the smart card communication protocol mode is selected, smart card 416 may next be configured to select, e.g. via determination circuit 218, an "addressed" device, e.g. first processor 206 or second integrated circuit 212. As explained in various embodiments, the selection may be made using at least one of the following processes: signaling from first controller circuit 502, e.g. signaling during smart card interface 204 activation, e.g. during specific signaling during 7816 interface activation; and/or protocol errors, e.g. errors during ISO 7816 protocol error.

FIG. 6A shows method 600 for operating a smart card, e.g. smart card 216, e.g. smart card 416, according to an embodiment.

In 610, (Power OFF stage), the system power may be off. First controller circuit 502 may be off. No signals may be received by the smart card, e.g. smart card 216, e.g. smart card 416.

In 610A, (Power ON stage) the system starts up. First controller circuit 502, which may be the system's host (main) controller circuit, may be powered on. A default setting of the smart card, may be that at power ON, first processor 206 may be in enabled mode, e.g. first processor 206 may be coupled to smart card interface 204, and second integrated circuit 212 may wait initialization, e.g. second integrated circuit 212 may be in wait init mode. It may also be possible that at system startup, e.g. at the start up of first controller circuit 502, first processor 206, e.g. one or more ISO 7816 compatible devices may be connected to smart card interface 204. Therefore, by default, e.g. after each reset and/or startup, first processor 206, e.g. the secure element, e.g. the trusted element, may be selected instead of second integrated circuit 212.

In 620, (Idle stage), the smart card, e.g. smart card 216, e.g. smart card 416, may be in idle mode of the start up process. Selectors, e.g. selector circuit 432, e.g. determination circuit 218, may be "listening" to the smart card interface 204 lines, e.g. to the ISO 7816 lines. Communication data may be sent either from first controller circuit or from second controller circuit 534.

Communication data may be sent from first controller circuit 502 to smart card interface 204 in accordance with the smart card communication protocol, therefore, smart card interface 204 may be configured to receive communication data, wherein the received communication data is configured in accordance with the smart card communication protocol.

In 620, smart card 416 may begin to receive communication data from first controller circuit 502. First controller circuit 502 may provide a clock. During a first predetermined number of clock pulses, e.g. during the first 8 clock pulses, an input/output line of smart card interface 204 may be sampled in. Selector circuit 432 may be configured to select based on the received communication data, e.g. based on the first 8 clock pulses, whether smart card interface 204 is connected to first controller circuit 502 in smart card communication protocol mode, or if smart card interface 204 is connected to second controller circuit 534 in further communication protocol mode. In other words, selector circuit 432 may be configured to select based on the received communication data, e.g. based on the first 8 clock pulses, a smart card communication protocol mode or a further communication protocol mode.

If a predetermined value, e.g. a value 0xFF, is "read" by selector circuit 432 in the received communication data from first controller circuit 502 (in 620A), then the smart card communication protocol mode, e.g. ISO 7816 interface may be selected (in 640).

To indicated to the smart card that it is connected to the second controller circuit 534 and to select further communication protocol mode, e.g. SPI mode, the second controller circuit 534 may send a predefined/special value, just once during start up, e.g. that does not equal 0xFF or 0x00. In other words, if any other value is "read" by selector circuit 432 in the received communication data from the external controller circuit (in 620B), which is not a "constant 111 . . . 11" or "constant 00 . . . 00", then further communication protocol mode, e.g. SPI, may be selected (in 630).

If further communication protocol mode is selected by selector circuit 432, smart card interface 204 may be configured to communicate in accordance with the further communication protocol. Furthermore, if further communication protocol mode is selected by selector circuit 432, then first processor 206 may be switched to a reset state, e.g. disabled. Furthermore, smart card interface 204 may be coupled to second controller circuit 534. Furthermore, determination circuit 218 may determine that second integrated circuit 212 be coupled to smart card interface 204, e.g. in SPI mode (in 630).

If smart card communication protocol mode is selected by selector circuit 432 (in 640), an activation sequence may be carried out: Smart card interface 204 may continue to receive communication data from first controller circuit 502, wherein the received communication data may be used to determine whether first processor 206 or second integrated circuit 212 should be coupled with smart card interface 204. In other words, determination circuit 218 of smart card interface 204 may further wait for further communication data, e.g. answer to reset ATR, e.g. PPS exchange message PPS or PPS*. PPS represents a frame with a correct checksum PCK, and PPS* represents a frame with a wrong checksum PCK. Smart card interface 204 may be configured to receive further communication data wherein selector circuit 432 selects the smart card communication protocol, and wherein determination circuit 218 may be configured to determine from the received further communication data whether first processor 206 or second integrated circuit 212 should be coupled to smart card interface 204. Determination circuit 218 may be configured to determine, e.g. based on the received communication data, whether first processor 206 or second integrated circuit 212 should be coupled with smart card interface 204 based on a checksum value of the received communication data. The check sum value may be based on a protocol and parameter selection PPS exchange message of the received communication data. Determination circuit 218 may be configured to determine whether first processor 206 or second integrated circuit 212 should be coupled with smart card interface 204 based on a protocol and parameter selection exchange message of the received communication data. The determination may be carried out using a corrupted standard compliant communication frame, e.g. a standard compliant ISO communication frame. For example, the determination may be based on the PPS exchange message using a PCK byte (check sum). If smart card communication protocol mode is selected, e.g. if ISO 7816 mode is selected, determination circuit 218 may listen to the lines until the PPS exchange is completed.

In 640A, determination circuit 218 determines that PCK matches the PPS message. First processor 206 may be selected (in 650), e.g. only the secure element may be selected. Second integrated circuit 212, may become silent, e.g. disabled and wait for the next reset. According to various other embodiments, a time out TO, or no PPS message may also cause the determination circuit 218 to select first processor 206. Coupling circuit 428 may be connected to determination circuit 218, wherein coupling circuit 428 may be configured to couple 204 smart card interface with first processor 206 or second integrated circuit 212 based on a determination by determination circuit 218.

In 640B, determination circuit 218 determines that PCK does not match the PPS message. Second integrated circuit 212 may be selected (in 660). First processor 206, i.e. the chip card, may become silent, e.g. disabled, and wait for the next reset. Once a device is selected, all the others may be disconnected from the 7816 interface. Determination circuit 218 may be configured to determine that second integrated circuit 212 should be coupled with smart card interface 204 wherein selector circuit 432 selects the further communication protocol. Converter circuit 222, which may include a protocol converter, may assert the reset signal for first processor 206, i.e. the chip card controller, and keep it asserted till the next reset/power off-on cycle. Meanwhile, determination circuit 218 may select second integrated circuit 212 and couple second integrated circuit 212 to smart card interface 204 which may be in selected smart card communication protocol mode.

In other words, coupling circuit 428 may be configured to couple smart card interface 204 with one of first processor 206 and second integrated circuit 212 and to disable the other of first processor 206 and second integrated circuit 212 from smart card interface 204 based on a determination by determination circuit 218.

Figure 6:
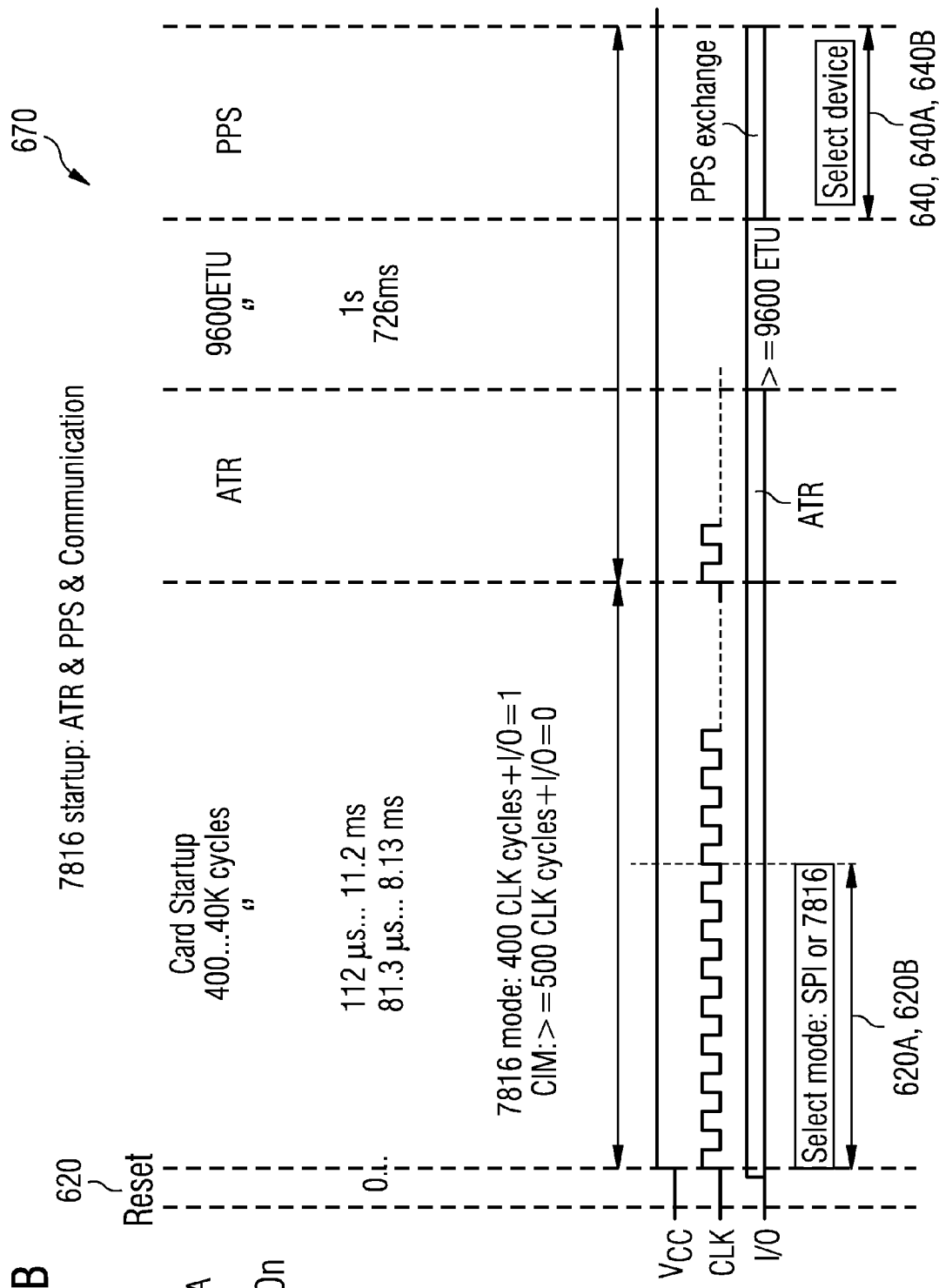
FIG. 6A shows a method for operating a smart card according to an embodiment.
FIG. 6B shows a signaling and timing diagram of the activation sequence of a smart card according to an embodiment.

According to various embodiments, the smart card may also wait for a reset signal throughout the processes, e.g. as indicated by the WR loops in FIG. 6.

At any time, a cold reset CR of the system may be carried out during the operation of the smart card. When a cold reset is carried out, the arrangement may be configured to return to the default setting. In other words, first processor 206 may be enabled, e.g. first processor 206 may be coupled to smart card interface 204, and second integrated circuit 212 may be wait initialization, e.g. second integrated circuit 212 may be in wait init mode.

FIG. 6B shows a signaling and timing diagram of the activation sequence for selecting first processor 206 or second integrated circuit 212.

It may be understood that the timings are provided for understanding only, and the embodiments are not limited to having the timings presented in the diagrams.

According to various embodiments, the timings may be estimated by considering two standard ISO 7816 clock frequencies: 3.5712 MHz and 4.9152 MHz.

Power on may result in Vcc changing from "0" state to "1" state. It may be understood, that smart card communication protocol mode may be selected by default, and smart card, e.g. smart card 216, e.g. smart card 416, may be coupled to first controller circuit 502 by default. First controller circuit 502 may send communication data to the smart card via a default smart card communication protocol, e.g. ISO 7816. The selection mechanism may rely on standard 7816 start up. At Power on reset (POR) or cold reset (CR), the smart card first selects the protocol mode, and then selects the device, i.e. first processor 206 or second integrated circuit 212.

Following power on, a reset may take place, and first controller circuit 502 may provide a clock input, starting at e.g. t=0 seconds. Start up of the smart card may be carried out. Within the first 400 clock cycles to 40000 clock cycles, smart card communication protocol or further communication protocol mode (i.e. selection of first controller circuit 502 or second controller circuit 534) may be selected. It may be understood that traditionally in conventional ISO 7816 protocols, the first 400 clock cycles are not used. Therefore, as shown according to various embodiments, the first 400 clock cycles are used for the selection of first controller circuit 502 or second controller circuit 534. It may be estimated that the first 400 clock cycles may take approximately 112 µs and the first 40000 clock cycles may take approximately 11.2 ms with a 3.5712 MHz clock frequency. It may be estimated that the first 400 clock cycles may take approximately 81.3 µs and the first 40000 clock cycles may take approximately 8.13 ms with a 4.9152 MHz clock frequency. Smart card communication protocol or further communication protocol mode may, for example, be selected within the first eight clock cycles.

Assuming smart card communication protocol mode is selected, after the first 400 clock cycles to 40000 clock cycles, both first processor 206 and determination circuit 218 must listen to the smart card interface 204 lines until the PPS exchange is completed. The following sequence may be carried out and is explained in more detail below:

Read ATR
Wait 9600 ETU
If PPS and wrong PCK then select second integrated circuit 212, else select first processor 206.
Disable selector circuit 432, determination circuit 218, coupling circuit 428

Smart card, e.g. smart card 216, e.g. smart card 416, may execute an Answer To Reset ATR process. For example, indicating to the host controller that the power on was succesful. After the ATR process, the smart card may continue to receive further communication data from first controller circuit 502 according to smart card communication protocol mode, e.g. ISO 7816. Further communication data may include a protocol and parameter selection PPS exchange message received by the smart card. The PPS message may be received after one or more clock cycles. According to a smart card communication protocol standard, the PPS message may be received after 9600 ETU, wherein 1 ETU (elementary time unit) includes 372 clock cycles.

After one of first processor 206 or second integrated circuit 212 is selected, a data portion of communication data may be received by the selected one of first processor 206 or second integrated circuit 212 from first controller circuit 502.

Figure 7:
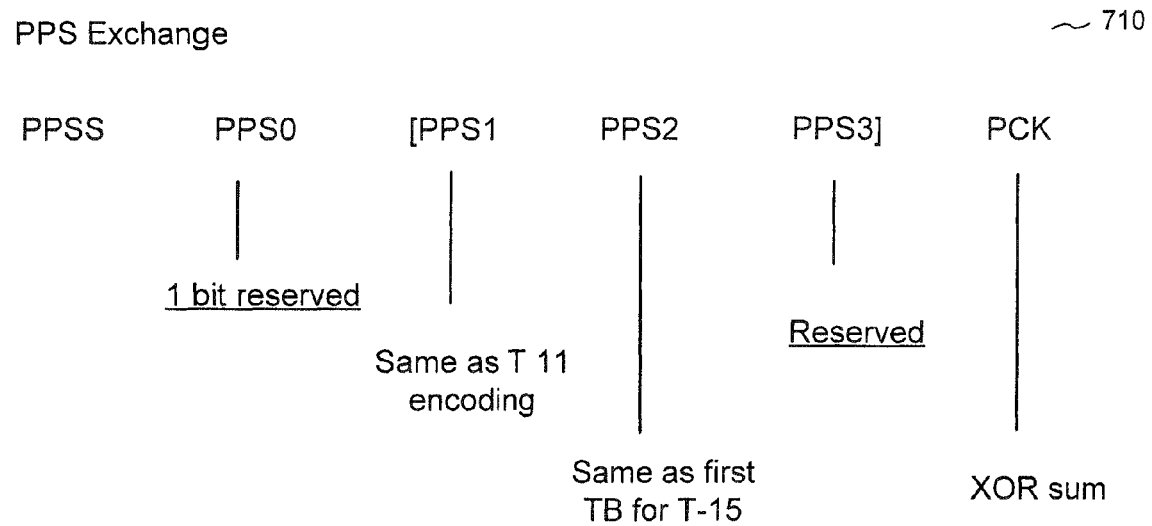
FIG. 7 shows a diagram of smart card PPS message according to an embodiment.

FIG. 7 shows a diagram of a PPS message 710 according to an embodiment. The PPS message, e.g. PPS message 710, may include PPSS PPS0, PPS1, PPS2, PPS3, PCK bits. Based on the PPS exchange message, a wrong checksum may result in determination circuit 218 selecting second integrated circuit 212. First processor 206 may ignore a wrong PPS frame (with incorrect checksum) and may silently wait for the next cold reset.

Unused bits of PPS exchange message 710 may be used for the selection process. According to a smart card communication protocol, e.g. ISO 7816 protocol, PPS0 may include a reserved bit; the optional PPS3 byte is also reserved (and are marked in square brackets as of today). It may be understood that although up till the now the one or more of the reserved bits in bytes (PPS1, PPS3) may be used for the selection, however the reserved bits are not limited to being in bytes PPS1 and PPS3, as the reserved bits may vary according to the smart card communication protocol, e.g. according to changes and/or extensions to the smart card communication protocol.

Wrong checksum PCK in PPS exchange message 710 may be used for the selection process. Therefore, first controller circuit 502 may input a wrong checksum into PPS exchange message 710 to instruct the smart card to select second integrated circuit 212. A correct check sum value in PCK, may instruct the smart card to select first processor 206.

Figure 8:
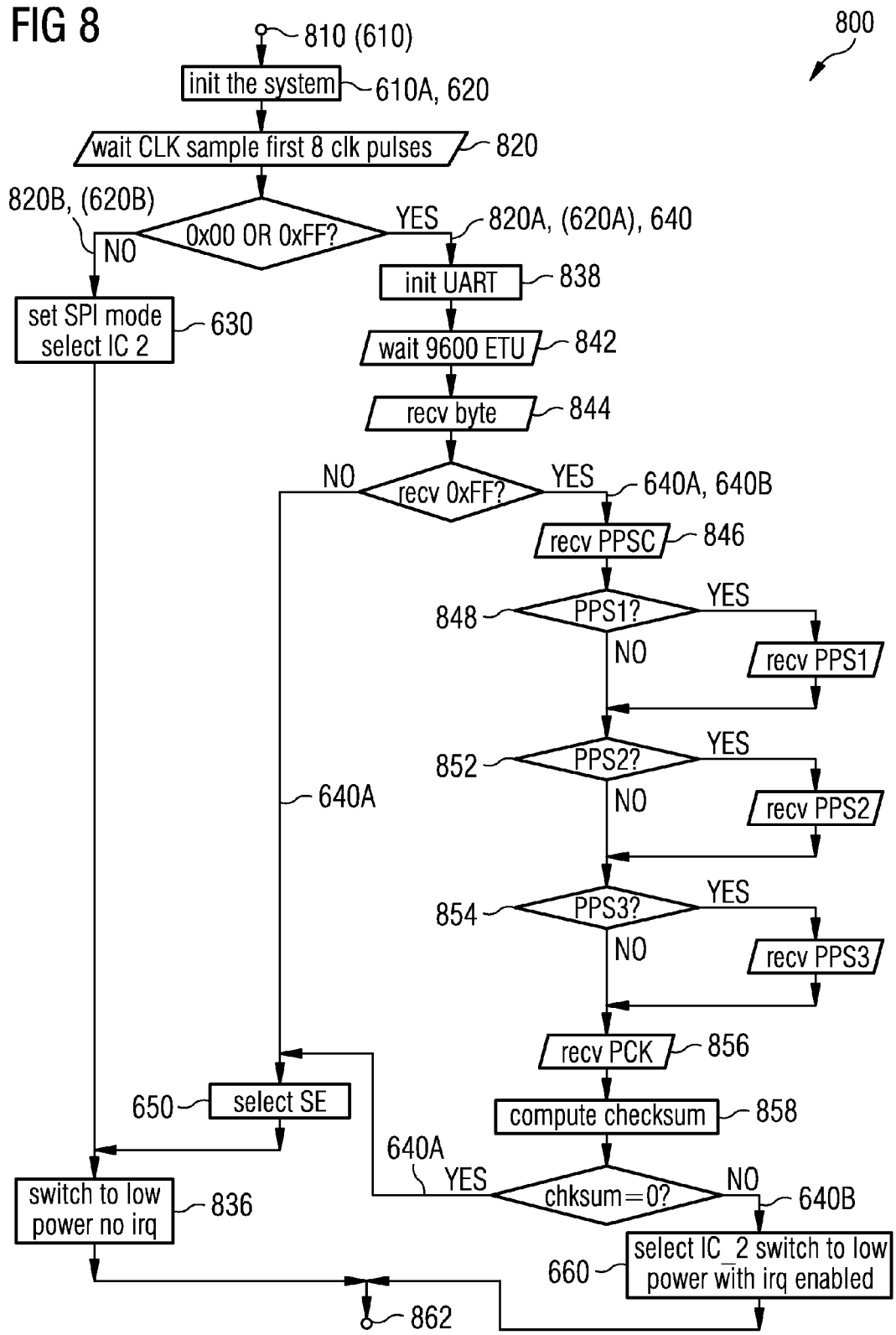
FIG. 8 shows a method for operating a smart card according to an embodiment.

FIG. 8 shows method 800 for operating a smart card, e.g. smart card 216, e.g. smart card 416, according to an embodiment. Method 800 shows the selection of first processor 206 or second integrated circuit 212 based on PPS exchange message 710.

In 810, the system may be initialized, as described according to processes 610 and 610A already described above.

In 820, smart card, e.g. smart card 216, e.g. smart card 416 may wait for clock signal CLK, to sample first 8 clock pulses, as described according to process 620.

In 820A, 820B, smart card, e.g. smart card 216, e.g. smart card 416 may decide between smart card communication protocol mode or further communication protocol mode, as described according to processes 620A and 620B. As with process 620B, in 820B, if a value is received e.g. not 0x00, e.g. not 0xFF, then further protocol mode may be selected, furthermore, smart card interface 204 may be coupled to second integrated circuit 212 as described according to process 630. In 836, the selector, e.g. selector circuit 432, determination circuit 218, coupling circuit 428, may switch to low power until next cold reset/power on reset.

As with process 620A, in 820A, if a value is received e.g. 0x00, e.g. 0xFF is received, then smart card communication protocol mode may be selected as in process 640. First controller circuit 502 may remain coupled with smart card interface 204. Smart card interface 204 may further wait for further communication data, e.g. answer to reset ATR, e.g. PPS exchange message PPS or PPS*. In 838, UART which may be part of determination circuit 218, may be initialized and ATR is received. In 842, the smart card may wait 9600 ETU. In 844, smart card, e.g. determination circuit 218 may await to receive PPS byte. If the PPS exchange message byte, e.g. 0xFF, is not received, determination circuit 218 may select first processor 206 as described according to process 640A. If PPS exchange message byte 0xFF is received, smart card 204, e.g. determination circuit 218 may receive byte PPS0 in 846. Then, smart card 204, e.g. determination circuit 218 may receive or optionally not receive the bytes of PPS exchange message, e.g. PPS1, PPS2, PPS3 in processes 848 to 854. In 856, smart card 204, e.g. determination circuit 218 may receive byte PCK. In 858, smart card 204, e.g. determination circuit 218 may compute checksum PCK over the complete PPS frame.

If PCK is correct (i.e. PPS), e.g. chksm equals 0x00, then first processor 206 may be selected, as in processes 640A and 650 already described previously. Process 836 may be carried out, wherein the determination circuit 218 may switch to low power.

If PCK is not correct (i.e. PPS*), e.g. chksm not equals 0x00, then second integrated circuit 212 may be selected as in process 640B and 660 as already described previously. The determination circuit 218 may switch to low power.

In 862, communication data may be received by smart card 204, e.g. smart card 216, e.g. smart card 416, via smart card interface 204. Communication data may either be from first controller circuit 502 or second controller circuit 534. If further communication protocol mode has been selected, and second integrated circuit 212 and second controller circuit 534 are coupled to smart card interface 204, then communication data may be exchanged between second integrated circuit 212 and second controller circuit 534 according to the further communication protocol without a need for protocol conversion.

If smart card communication protocol mode has been selected, and first processor 206 and first controller circuit 502 are coupled to smart card interface 204, then communication data may be exchanged between first processor 206 and first controller circuit 502 according to the smart communication protocol without a need for protocol conversion.

If smart card communication protocol mode has been selected by selector circuit 432, and second integrated circuit 212 has been selected by determination circuit 218, i.e. if first controller circuit 502 and second integrated circuit 212 are coupled to smart card interface 204, then communication data between first controller circuit 502 and second integrated circuit 212 may be converted by converter circuit 222, between smart card communication protocol and further communication protocol.

Figure 9:
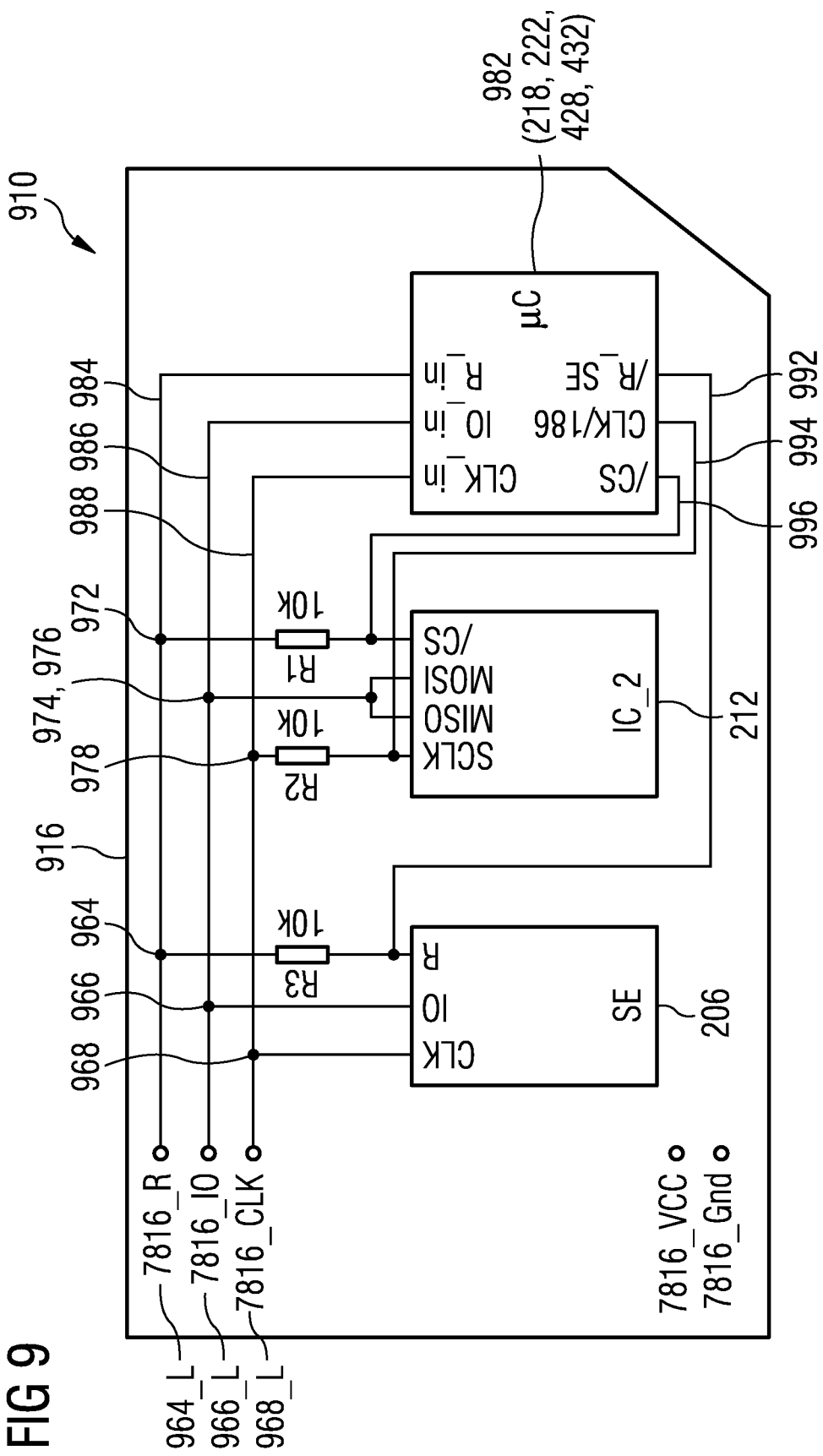
FIG. 9 shows a smart card arrangement according to an embodiment.

FIG. 9 shows smart card 916 according to an embodiment.

Smart card 916 may include one or more or all of the features already described with respect to smart card 216 and/or smart card 416 previously described. Smart card 916 may include first processor 206, second integrated circuit 212 and smart card interface 204. Smart card 916 may include determination circuit 218 and/or converter circuit 222 and/or coupling circuit 428 and/or selector circuit 432 as previously described. Each of first processor 206, second integrated circuit 212, smart card interface 204, determination circuit 218, converter circuit 222, coupling circuit 428, and selector circuit 432 may be implemented by any type of hard wired logic circuit and/or programmable logic circuit such as one or more Application Specific Integrated Circuits (ASIC), one or more Field Programmable Gate Arrays (FPGA), one or more Programmable Logic Arrays (PLA), or one or more programmable integrated circuits, such as e.g. one or more microprocessors or microcontrollers.

Smart card 916 may include a controller circuit arrangement 982, e.g. a microcontroller circuit. Controller circuit arrangement 982 may include determination circuit 218 and/or converter circuit 222 and/or coupling circuit 428 and/or selector circuit 432, each configured as programmable logic circuits, e.g. ASIC, FPGA, PLA. Controller circuit arrangement 982 may be configured as a converter circuit 222 for protocol conversion and logic conversion.

First processor 206 which may be configured in accordance with a smart card communication protocol may include a smart card communication protocol reset R pin 964, a smart card communication protocol input/output IO pin 966, and a smart card communication protocol clock CLK pin 968. Smart card communication protocol reset R pin 964 may be connected to smart card communication protocol$_{13}$ R line 964L, e.g. a 7816_R line, of smart card interface 204. Smart card communication protocol input/output IO pin 966 may be connected to smart card communication protocol_IO line 966L, e.g. a 7816_IO line, of smart card interface 204. Smart card communication protocol clock CLK pin 968 may be connected to smart card communication protocol_CLK line 968L, e.g. a 7816_CLK line, of smart card interface 204.

Second integrated circuit 212 which may be configured in accordance with a further communication protocol may include a further communication protocol chip select CS pin 972, further communication protocol Master In Slave Out MISO and Master Out Slave In MOSI pins 974, 976 and further communication protocol SCLK pin 978.

In the case wherein second integrated circuit may be selected the following adaptations to the smart card interface 204 may take place. Further communication protocol MISO MOSI pins 974, 976 may share smart card communication protocol_IO line 966L, e.g. a 7816_IO line, with smart card communication protocol input/output IO pin 966. Further communication protocol SCLK pin 978 may share smart card communication protocol_CLK line 968L, e.g. a 7816_CLK line with smart card communication protocol clock CLK pin 968. Further communication protocol chip select CS pin 972 may share smart card communication protocol_R line 964L, e.g. a 7816_R line with Smart card communication protocol reset R pin 964.

Converter circuit 222, which may be part of a programmable controller circuit arrangement 982, or a hard wired circuit, may be carried out to convert smart card communication protocol to further communication protocol conversion. The default communication parameters may include dividing the smart card communication protocol by a division factor according to a conversion algorithm.

Controller circuit arrangement 982 may include converter circuit 222, and may include a controller circuit arrangement reset R_in pin 984, a controller circuit arrangement input/output IO_in pin 986, and controller circuit arrangement clock CLK_in pin 988. Controller circuit arrangement 982, e.g. converter circuit 222, may further include a controller circuit arrangement output reset R_SE pin 992, a controller circuit arrangement output clock CLK/186 pin 994 and a controller circuit arrangement output chip select CS pin 996.

If second integrated circuit 212 is selected and to be used in further communciation protocol mode, in other words, to communcate with second controller circuit 534, a smart card communication protocol_R line, e.g. a 7816_R line, of smart card interface 204 may be used as chip select CS for the second integrated circuit 212, because second integrated circuit 212, e.g. the IC2, needs to know when to start executing received commands, or switch mode etc.

If second integrated circuit 212, is selected and to be used in smart card communication protocol mode, in other words, to be communcate with first controller circuit 502, a first warm reset R may assert chip select CS of second integrated circuit 212 and a next warm reset R may deassert it. A cold reset CR may reset the entire system.

The logic which selects the second integrated circuit 212, e.g. the IC2 or first processor 206, e.g. the secure element, may be implemented in second integrated circuit 212, e.g. the IC2. First processor 206 and second integrated circuit 212, e.g. the IC2 may be integrated into a smart card circuit, and interconnected as shown in FIG. 9. When second integrated circuit 212, e.g. the IC2, is selected, the first processor 206, e.g. secure element, may be kept in reset state, e.g. via smart card communication protocol reset R pin 992 from controller circuit arrangement 982.

The selections are valid until the next cold reset CR, e.g. the selection may be valid until the next power off/on cycle. After selection the selectors may be switched to low power mode.

Figure 10:
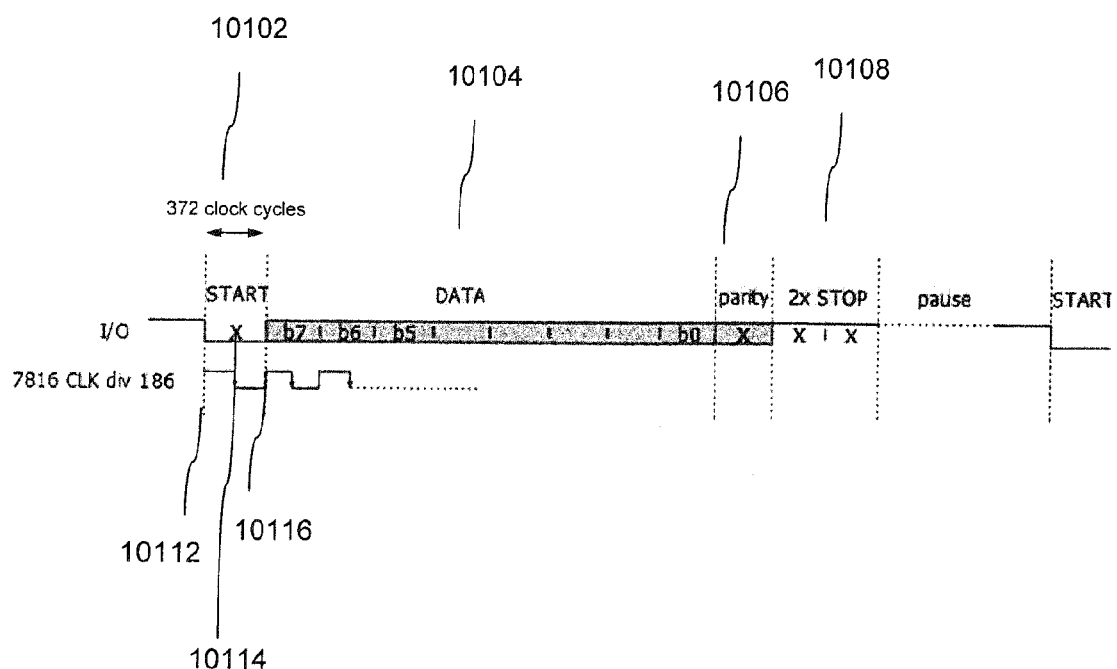
FIG. 10 shows a diagram of smart card communication data according to an embodiment.
Figure 11:
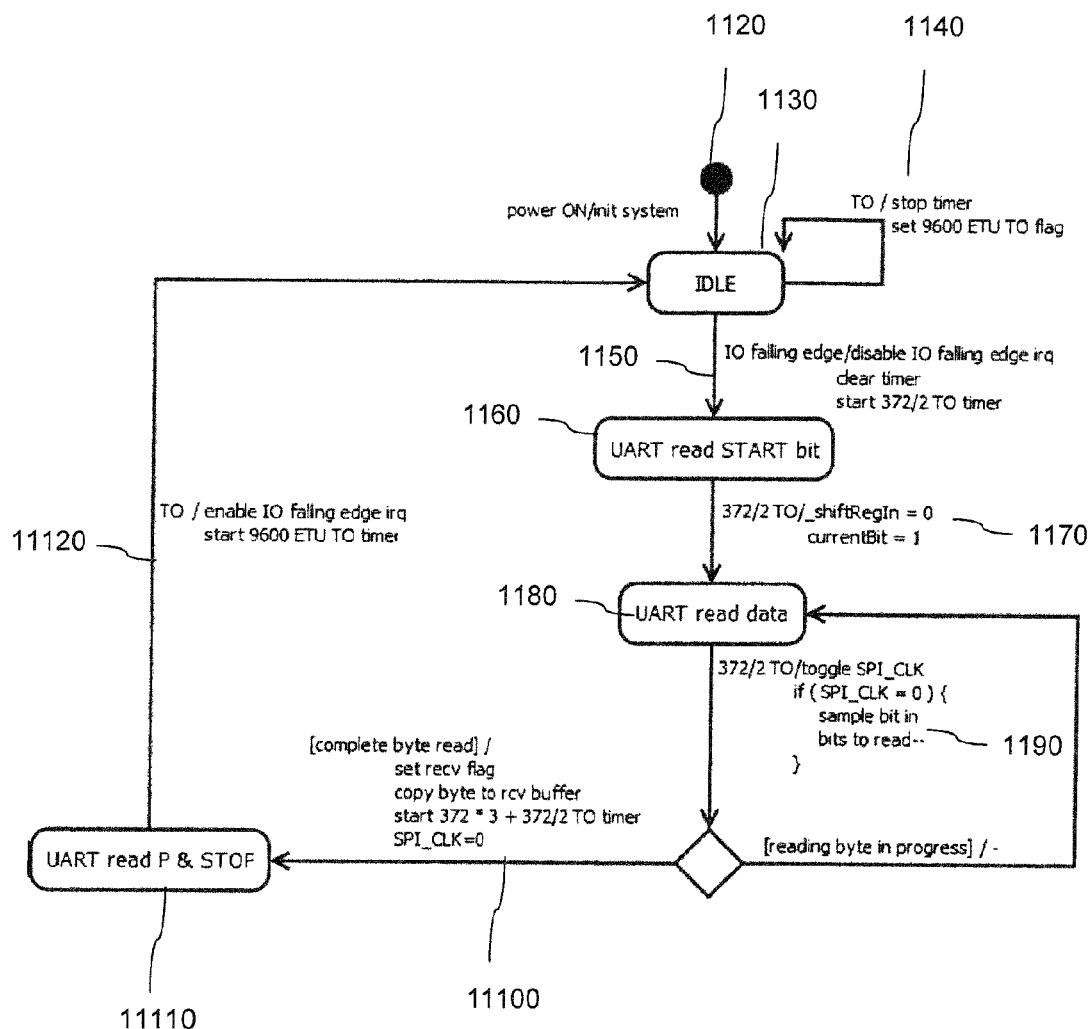
FIG. 11 shows a method for operating a smart card according to an embodiment.

FIGS. 10 and 11 describe how communication data sent from first controller circuit 502 to second integrated circuit 212 may be converted from smart card communication protocol to further communication protocol.

FIG. 10 shows a diagram of received communication data according to an embodiment. FIG. 10 shows a portion of received communication data 1010 which may be sent by first controller circuit 502 if smart card communication protocol mode has been selected by selector circuit 432.

In accordance with the smart card communication protocol, data portion 10104 may be configured to have a predetermined division factor and a predetermined data format. Data portion 10104 as shown in FIG. 10 is shown to have the following default communication parameters according to the smart card communication protocol: Division Factor DF=372, 8E2 data format. As shown in FIG. 10, the data bits may be shown to be arranged from b7 to b0. This may be indicative of inverse convention wherein bits with logic value "1" are low voltage and bits with logic value "0" are high voltage. However, inverse convention may not necessarily be used according to various embodiments, and direct convention can instead be implemented. For example, data bits may be arranged from b0 to b7, and bits with logic value "1" are high voltage and bits with logic value "0" are low voltage.

According to the 8E2 format of the smart card communication protocol, data portion may include one start bit 10102, eight data bits 10104, one parity bit 10106 and two stop bits 10108. According to the smart card communication protocol each bit may last 372 clock cycles.

Data portion 10104 of received communication data between first controller circuit 502 and second integrated circuit 212 may be converted by converter circuit 222 from the smart card communication protocol to the further communication protocol.

Reading in one byte (e.g. the 12 bits) over smart card communication protocol, e.g. over ISO 7816 interface, to be converted to further communication protocol, may require a clock conversion to the further communication protocol, and to ignore certain bits of the smart card communication protocol data. Converter circuit 222 may be configured to reconfigure a clock in accordance with the second communication protocol. Converter circuit 222 may be configured to skip the START bit, parity and STOP bits.

For example, converter circuit 222, via one or more logic circuits, may be configured to skip at least one of the START, parity and STOP bits.

For example, a 186 divider may be implemented on the clock line so that one bit may last 1 clock cycle according to the further communication protocol data. In accordance with the smart card communication protocol, e.g. ISO 7816, one bit may last 372 clock cycles. In accordance with the further communication protocol, e.g. SPI, one bit may last 1 clock cycle. In other words, therefore, converter circuit 222 may be configured to divide the 7816 clock such that one clock cycle in accordance with the further communication protocol lasts 372 clock cycles in accordance with smart card communication protocol (e.g. ISO 7816 communiation protocol).

FIG. 11 shows method 1110 for operating a smart card according to an embodiment. FIG. 11 shows method 1110 for generating a clock according to the further communication protocol and converting data 1010 from smart card communication protocol to further communication protocol.

Converter circuit 222 may be configured to execute the following algorithm for converting data 1010 from smart card communication protocol to further communication protocol.

Wait falling edge if IO (process 1150)
Enable 186 counter (process 1150)
Wait TO (mid of START bit) (process 1160, do initialization of the internal variables for data reception (process 1170);
For i=0 . . . 7 (process 1180)
  enable 186 counter (process 1190)
  wait TO; toggle SCLK (process 1190)
  enable 186 counter (process 1190)
  wait TO (mid of i-th bit); toggle SCLK (process 1190)
  sample bit in (process 1190)
    For i=0 . . . 2(parity, stop, stop) (process 11100)
  enable 186 counter
  wait TO; toggle SCLK
  enable 186 counter
  Wait TO (mid of i-th bit); toggle SCLK.

In 1120, the system may be powered to ON and the system may be initialized (as in 610A).

The circuits 218, 222 are in idle state—in 1130—after power up, cold reset or after the reception of a complete byte transferred over the 7816 interface. This byte may come from the external master 502 or from the secure element 206.

After each received byte the 9600 ETU timer is started. The purpose is to detect the 9600 ETU gap following the ATR—see FIG. 6B. Once the gap is detected a flag is set in 1140. From this moment onwards the circuit 218 may wait for the first PPS byte (step 844 in FIG. 8)

In 1150 (after 9600 ETU), in order to read byte into second integrated circuit 212, converter circuit 222 waits for a trigger by the start bit, which may be indicated as a falling edge 10112 of the start bit on the input/out IO line. When IO goes to low, i.e. at IO falling edge, the converter timer, e.g. the 372/2 timer may be started.

In 1160, converter circuit 222 may read the START bit. As the timer counts 186 clock cycles, then after 186 clock cycles, the converter is initialized to start sampling the incoming data. Also the SPI clock generator is enabled.

In 1170, after 186 clock cycles the converter circuit 222 reaches the leading edge of the first data bit 10116. At this moment it only needs to initialize the shift register for the incoming data.

In 1180, converter circuit 222 toggles the SPI clock, i.e. SCLK. In other words an SPI timer may be configured, which may be triggered every half bit. At each trigger the SPI clock is toggled. The data bits 10104 may be sampled in the middle of the bit time, on the falling edge of the SPI clock. However, it may be understood, that according to various other embodiments, the data bits 10104 may be sampled on the rising edge of the SPI clock, for example, depending on second integrated circuit 212.

At start of data bit b7, converter circuit 222 toggles the SPI clock from 0 to 1. Converter circuit 222 waits for time out TO to middle of bit b7, i.e 186 clock cycles and toggles SCLK to low (in 1190). At the same time the data bit b7 is sampled. Processes 1180 and 1190 may be repeated for each of further data bits b6 to b0.

In 11100, when reading of further data bits is completed, a receive flag may be set, and the byte may be copied to a receiver buffer. The parity bit 10106 and two stop bits 10108, may be skipped. Therefore a timer may configured to wait for 372*3+372/2 clock cycles (clock cycles for last half bit of bit b0 and for three bits).

In 11110, converter circuit 222 waits for the time out defined above to elapse; the SPI clock is stopped, i.e. no further toggling. This time out interval covers the transmission of parity and stop bits from the master; these bits are irrelevant for the SPI circuit 212.

In 11120, interrupt request may be enabled for IO falling edge. The 9600 ETU TO timer may be enabled again, and the smart card may return to idle state.

Converter circuit 222 may include an asynchronous circuit, e.g. an universal asynchronous receiver/transmitter UART.

Figure 12:
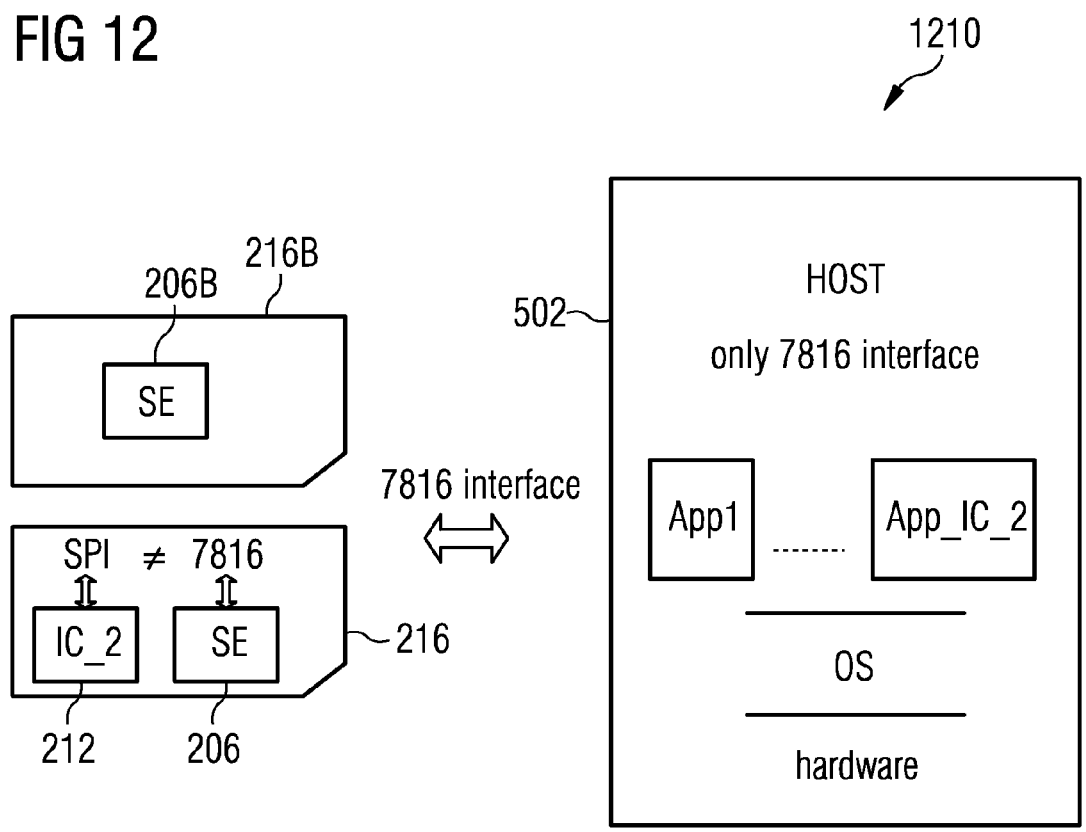
FIG. 12 shows a smart card arrangement according to an embodiment.

As shown in FIG. 12, various embodiments are not limited to including only one smart card coupled to first controller circuit 502. According to various embodiments, in addition to a first smart card 216 as described according to various embodiments, another smart card, e.g. smart card 216 may be coupled via a smart card communication protocol to first controller circuit 502 as well. In other words, backward compatibility of the smart card and host controller system with conventional smart cards may be preserved. Furthermore, existing infrastructure may be used.

For example, a smart card may have requirements which include that a second integrated circuit 212 may be available through smart card communication protocol, i.e. ISO 7816, possibly non-simultaneously with first processor 206, i.e. secure element. The smart card may continue to be compliant and compatible with existing chip card and/or smart card standards, and may support a CB SE (contact based secure element) with minimal and/or no change in the first processor 206 firmware/software.

Various embodiments may provide tunneling of SPI through 7816 host controller circuit to the smart card. Various embodiments may provide support for half duplex SPI over ISO 7816 contacts.

Various embodiments provide a smart card which uses several state machines and a selection mechanism based on ISO 7816 communication frames. Various embodiments may allow connection of a non-ISO 7816 device to a, ISO 7816 interface (tunneling). A smart card may function regularly, e.g. like a regular SIM, transparent for SE or Host.

Various embodiments provide a smart card configured to select SPI mode over 7816 lines in the very first clock cycles. This is useful in case the smart card is connected to an SPI HOST (for debugging, fast personalization etc).

FIG. 13 shows smart card chip arrangement 1310 according to various embodiments. Smart card chip arrangement 1310 show a first processor 206 (e.g. first chip 106); second integrated circuit 212 (e.g. second chip 112) and smart card interface 204 arranged on a printed circuit board; and controller circuit arrangement 982 which may include determination circuit 218 and/or converter circuit 222 and/or coupling circuit 428 and/or selector circuit 432.

Various embodiments provide a smart card including: a first processor; a second integrated circuit; a smart card interface configured to provide communication in accordance with a smart card communication protocol; a determination circuit configured to determine whether the first processor or the second integrated circuit should be coupled with the smart card interface based on received communication data; a converter circuit coupled to the second integrated circuit and configured to convert received communication data between the smart card communication protocol and a further communication protocol wherein the smart card interface is coupled with the second integrated circuit.

According to an embodiment, the smart card includes a subscriber identification module card.

According to an embodiment, the smart card includes a universal integrated circuit card.

According to an embodiment, the smart card includes a secure digital card.

According to an embodiment, the first processor includes a trusted element configured to store and protect data information.

According to an embodiment, the first processor is configured to process encrypted data information wherein the encrypted data information is stored in a first memory connected to the first processor.

According to an embodiment, the first processor is configured to process encrypted data information, wherein the encrypted data information is encrypted according to at least one of the following encryption protocols: Data encryption standard (DES), triple data encryption standard (3DES), advance encryption standard (AES).

According to an embodiment, the first processor is configured to communicate via the smart card interface in accordance with the smart card communication protocol.

According to an embodiment, the second integrated circuit is configured to communicate in accordance with the further communication protocol, wherein the further protocol is different from the smart card communication protocol.

According to an embodiment, the second integrated circuit is connected to at least one external device from the following group of devices, the group consisting of: an antenna, a display, a sensor.

According to an embodiment, the smart card communication protocol includes an international standards organization 7816 protocol.

According to an embodiment, the further communication protocol includes at least one communication protocol from the following group of communication protocols, the group consisting of: a communication protocol for a serial interface, a communication protocol for a parallel interface, a communication protocol for a serial peripheral interface, a communication protocol for an I2C interface.

According to an embodiment, the smart card interface is configured to receive communication data, wherein the received communication data is configured in accordance with the smart card communication protocol.

According to an embodiment, the determination circuit is configured to determine whether the first processor or the second integrated circuit should be coupled with the smart card interface based on a checksum value of the received communication data.

According to an embodiment, the determination circuit is configured to determine whether the first processor or the second integrated circuit should be coupled with the smart card interface based on a protocol and parameter selection exchange message of the received communication data.

According to an embodiment, the determination circuit is configured to determine that the first processor should be coupled with the smart card interface when the received communication data meets a predefined criteria, and to determine that the second integrated circuit should be coupled with the smart card interface when the received communication data does not meet the predefined criteria.

According to an embodiment, the smart card further includes a coupling circuit connected to the determination circuit, wherein the coupling circuit is configured to couple the smart card interface with the first processor or the second integrated circuit based on a determination by the determination circuit.

According to an embodiment, the smart card further includes a coupling circuit connected to the determination circuit, wherein the coupling circuit is configured to couple the smart card interface with one of the first processor and the second integrated circuit and to disable the other of the first processor and the second integrated circuit from the smart card interface based on a determination by the determination circuit.

According to an embodiment, the smart card interface is further configured to provide communication in accordance with the further communication protocol;

According to an embodiment, the smart card further includes a selector circuit coupled to the determination circuit; wherein the selector circuit is configured select based on the received communication data the smart card communication protocol or the further communication protocol.

According to an embodiment, the determination circuit is configured to determine that the second integrated circuit should be coupled with the smart card interface wherein the selector circuit selects the further communication protocol.

According to an embodiment, the smart card interface is configured to receive further communication data wherein the selector circuit selects the smart card communication protocol, and wherein the determination circuit is configured to determine from the received further communication data whether the first processor or the second integrated circuit should be coupled to the smart card interface.

Various embodiments provide a method for operating a smart card, the method including: providing, by a smart card interface, communication in accordance with a smart card communication protocol; determining, by a determination circuit, whether a first processor or a second integrated circuit should be coupled with the smart card interface based on received communication data; converting, by a converter circuit coupled to the second integrated circuit, received communication data between the smart card communication protocol and a further communication protocol wherein the smart card interface is coupled with the second integrated circuit.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A smart card comprising:
    a first processor;
    a second integrated circuit;
    a smart card interface configured to provide communication in accordance with a smart card communication protocol;
    a determination circuit configured to determine whether the first processor or the second integrated circuit should be coupled with the smart card interface based on received communication data;
    a converter circuit coupled to the second integrated circuit and configured to convert received communication data between the smart card communication protocol and a further communication protocol wherein the smart card interface is coupled with the second integrated circuit.

2. The smart card according to claim 1,
    wherein the smart card comprises a subscriber identification module card.

3. The smart card according to claim 1,
    wherein the smart card comprises a universal integrated circuit card.

4. The smart card according to claim 1,
    wherein the smart card comprises a secure digital card.

5. The smart card according to claim 1,
wherein the first processor comprises a trusted element configured to store and protect data information.

6. The smart card according to claim 1,
wherein the first processor comprises a secure microcontroller.

7. The smart card according to claim 1,
wherein the first processor is configured to process encrypted data information wherein the encrypted data information is stored in a first memory connected to the first processor.

8. The smart card according to claim 1,
wherein the first processor is configured to process encrypted data information, wherein the encrypted data information is encrypted according to at least one of the following encryption protocols: data encryption standard, advanced decryption standard, triple data enecryption standard.

9. The smart card according to claim 1,
wherein the first processor is configured to communicate via the smart card interface in accordance with the smart card communication protocol.

10. The smart card according to claim 1,
wherein the second integrated circuit is configured to communicate in accordance with the further communication protocol, wherein the further protocol is different from the smart card communication protocol.

11. The smart card according to claim 1,
wherein the second integrated circuit is connected to at least one external device from the following group of devices, the group consisting of: an antenna, a display, a sensor.

12. The smart card according to claim 1,
wherein the smart card communication protocol comprises an international standards organization 7816 protocol.

13. The smart card according to claim 1,
wherein the further communication protocol comprises at least one communication protocol from the following group of communication protocols, the group consisting of: a communication protocol for a serial interface, a communication protocol for a parallel interface, a communication protocol for a serial peripheral interface, a communication protocol for an I2C interface.

14. The smart card according to claim 1,
wherein the smart card interface is configured to receive communication data, wherein the received communication data is configured in accordance with the smart card communication protocol.

15. The smart card according to claim 1,
wherein the determination circuit is configured to determine whether the first processor or the second integrated circuit should be coupled with the smart card interface based on a checksum value of the received communication data.

16. The smart card according to claim 1,
wherein the determination circuit is configured to determine whether the first processor or the second integrated circuit should be coupled with the smart card interface based on a protocol and parameter selection exchange message of the received communication data.

17. The smart card according to claim 1,
wherein the determination circuit is configured to determine that the first processor should be coupled with the smart card interface when the received communication data meets a predefined criteria, and to determine that the second integrated circuit should be coupled with the smart card interface when the received communication data does not meet the predefined criteria.

18. The smart card according to claim 1, further comprising a coupling circuit connected to the determination circuit,
wherein the coupling circuit is configured to couple the smart card interface with the first processor or the second integrated circuit based on a determination by the determination circuit.

19. The smart card according to claim 1, further comprising a coupling circuit connected to the determination circuit,
wherein the coupling circuit is configured to couple the smart card interface with one of the first processor and the second integrated circuit and to disable the other of the first processor and the second integrated circuit from the smart card interface based on a determination by the determination circuit.

20. The smart card according to claim 1, wherein
the smart card interface is further configured to provide communication in accordance with the further communication protocol.

21. The smart card according to claim 20, further comprising
a selector circuit coupled to the determination circuit;
wherein the selector circuit is configured select based on the received communication data the smart card communication protocol or the further communication protocol.

22. The smart card according to claim 21,
wherein the determination circuit is configured to determine that the second integrated circuit should be coupled with the smart card interface wherein the selector circuit selects the further communication protocol.

23. The smart card according to claim 22,
wherein the smart card interface is configured to receive further communication data wherein the selector circuit selects the smart card communication protocol, and wherein the determination circuit is configured to determine from the received further communication data whether the first processor or the second integrated circuit should be coupled to the smart card interface.

24. A method for operating a smart card, the method comprising:
providing, by a smart card interface, communication in accordance with a smart card communication protocol;
determining, by a determination circuit, whether a first processor or a second integrated circuit should be coupled with the smart card interface based on received communication data;
converting, by a converter circuit coupled to the second integrated circuit, received communication data between the smart card communication protocol and a further communication protocol wherein the smart card interface is coupled with the second integrated circuit.

* * * * *